(12) United States Patent
Lee

(10) Patent No.: US 6,417,846 B1
(45) Date of Patent: Jul. 9, 2002

(54) MULTIFUNCTION INPUT DEVICE

(76) Inventor: Si-Ken Lee, 3F, No. 7, Lane 302, Tsun Hsien Street, Taipei City (TW)

(*) Notice: Subject to any disclaimer, the term of this patent is extended or adjusted under 35 U.S.C. 154(b) by 0 days.

(21) Appl. No.: 09/495,930

(22) Filed: Feb. 2, 2000

(51) Int. Cl.[7] .................................................. G09G 5/00
(52) U.S. Cl. ..................... 345/173; 345/174; 178/18.01; 178/18.06
(58) Field of Search ................................. 345/173, 174; 178/18.01, 18.06

(56) References Cited

U.S. PATENT DOCUMENTS

| | | | | |
|---|---|---|---|---|
| 5,007,085 A | * | 4/1991 | Greanias et al. ............... | 380/25 |
| 5,402,151 A | * | 3/1995 | Duwaer ....................... | 345/173 |
| 5,589,856 A | * | 12/1996 | Stein et al. .................. | 345/173 |
| 6,239,389 B1 | * | 5/2001 | Allen et al. ............... | 178/18.01 |

* cited by examiner

Primary Examiner—Richard Hjerpe
Assistant Examiner—Jennifer T. Nguyen
(74) Attorney, Agent, or Firm—Robert E. Bushnell, Esq.

(57) ABSTRACT

A multifunction input device for use with a computer plotter system, word processing system, or Chinese hand-write recognition system, which includes a double-loop conductor array for use with a wireless battery-driven induction pen, a wireless non-battery induction pen, a static pen, a finger, and data processing circuit, wherein induction current and static current are produced upon approaching of the wireless induction pen, static pen, or finger, causing conductors of the double-loop conductor array to scan the position of the pen, and generate an enabling scanned signal, so that the XYZ coordinate values of the pen are sent to a host computer.

8 Claims, 15 Drawing Sheets

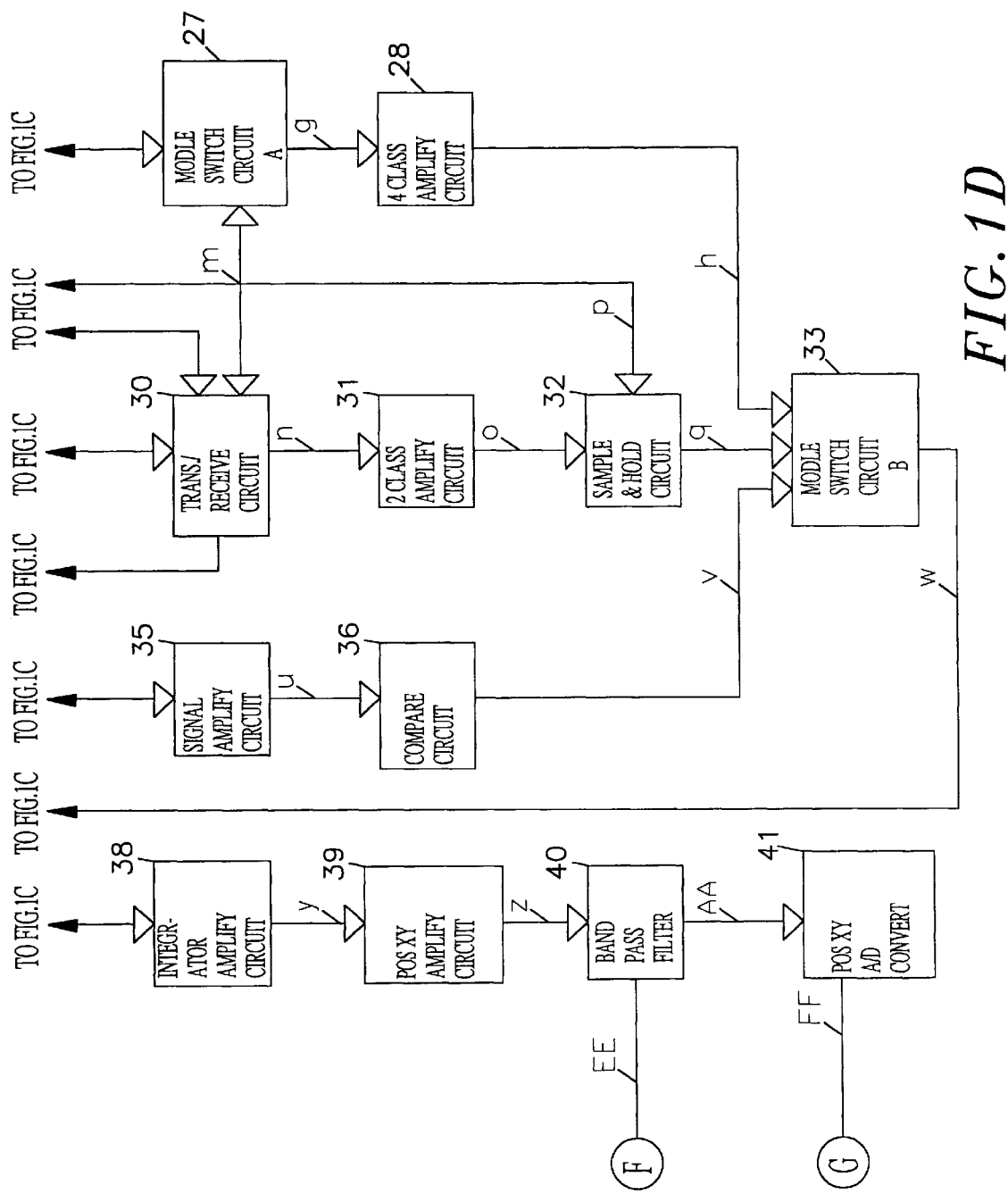

BATTERY MOUSE

NO BATTERY MOUSE

| FIG. 1A |
|---|
| FIG. 1B |

*FIG. 11*

| FIG. 1C |
|---|
| FIG. 1D |

*FIG. 12*

MULTIFUNCTION INPUT DEVICE

BACKGROUND OF THE INVENTION

The present invention relates to an input device for use with a computer plotting system, word processing system, Chinese hand-write recognition system, etc., and more particularly to a multifunction input device, which can be used with any of a variety of input media.

A variety of input devices, including mice, digitizers, touch pads, etc., have been disclosed for use with computer plotting systems, hand-write recognition systems, etc., and have appeared on the market. These input devices have different advantages. A mouse uses a track ball or optical reflecting medium to detect XY coordinates. This kind of input device can only be used for coordinate movement. It cannot be used for hand-write recognition. A touch pad uses resistance means as a medium. Either of carbon powder type or ITO type, a touch pad wears quickly with use, and its sensitivity tends to be affected by ambient humility. The service life of a touch pad is short (normally below one hundred thousands). Due to these drawbacks, this kind of touch pad is not used in expensive notebook computers. Regular capacitive type touch pads, which are commonly used in notebook computers, are durable in use. However, the sensitivity of a capacitive type touch pad tends to be affected by swear or moisture. Further, regular digitizers are commonly equipped with a wired induction pen. Because the induction pen of a digitizer is secured in place by a wire, the wire may hinder the movement of the user's hand when operating the induction pen. Further, because a digitizer is for XY two-dimension detection only, it cannot detect the pressure of the pen, i.e., the pen cannot be operated as a writing brush. Further, there is known a wireless induction pen (battery-driven) for use as an input medium. This kind of battery-driven wireless induction pen is functional. However, because the service life of the battery is short, the battery must be frequently replaced.

SUMMARY OF THE INVENTION

The present invention has been accomplished under the circumstances in view. It is the main object of the present invention to provide a multifunction input device, which is practical for use with any of a variety of input media for XYZ three-dimension coordinates detection. According to the present invention, the multifunction input device comprises a double-loop conductor array for use with a battery-driven wireless induction pen, a non-battery type wireless induction pen, a static pen, and/or the finger. Coordinate movement and pen/finger pressure are detected by the double-loop conductor array, and processed through a processing circuit. The coordinate value thus obtained can be transmitted to a network TV or computer by infrared, or through UART, PS/2, or USB interface means for computer plotting, hand-write recognition, network TV system operation control.

BRIEF DESCRIPTION OF THE DRAWINGS

FIGS. 1A, 1B, 1C, and 1D together form a system block diagram of the present invention.

FIG. 11 is a diagram showing how FIGS. 1A and 1B mate together.

FIG. 12 is a diagram showing how FIGS. 1C and 1D mate together.

DETAILED DESCRIPTION OF THE PREFERRED EMBODIMENT

Figure 1A:
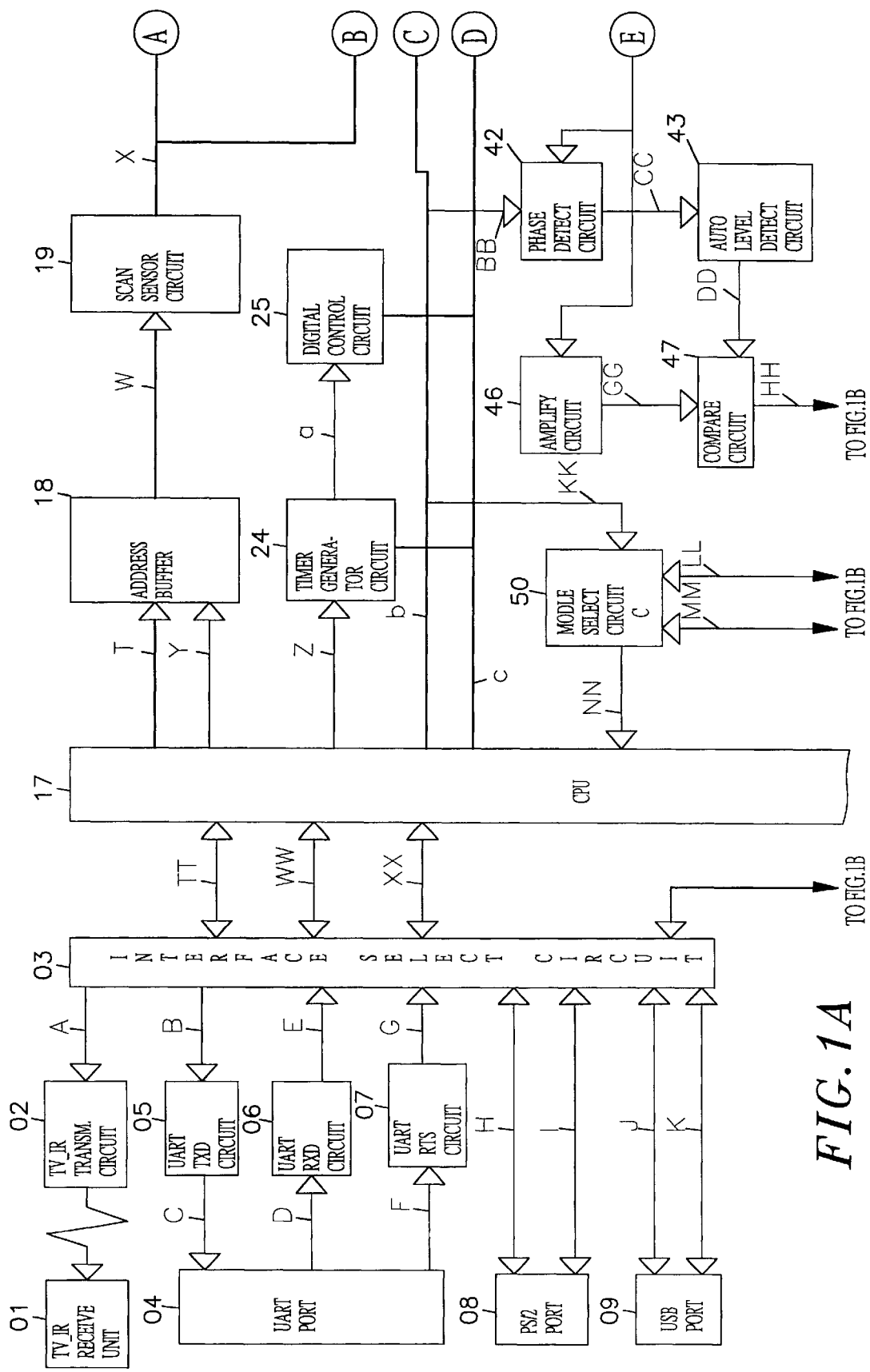
Figure 1B:
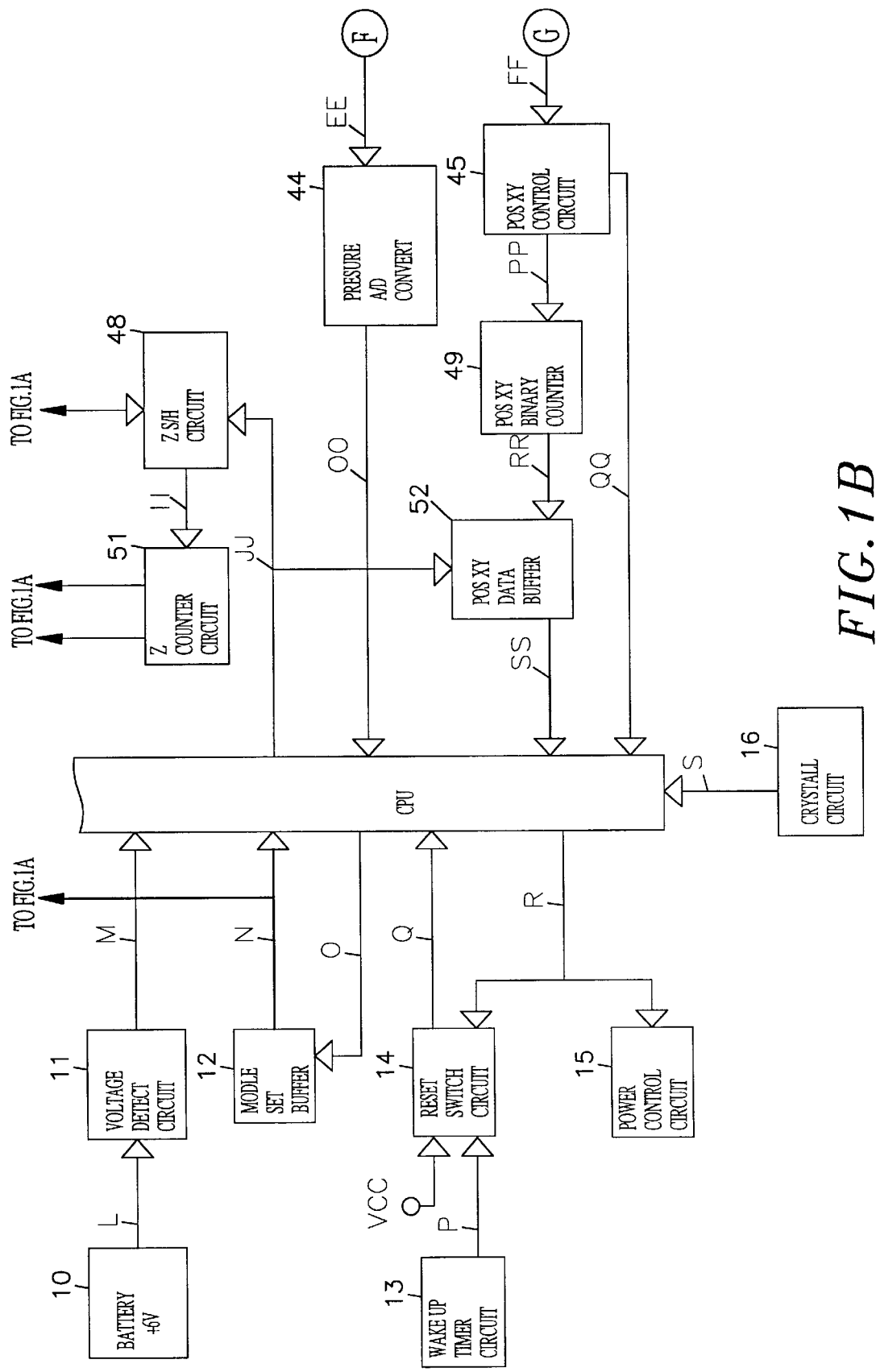
Figure 1C:
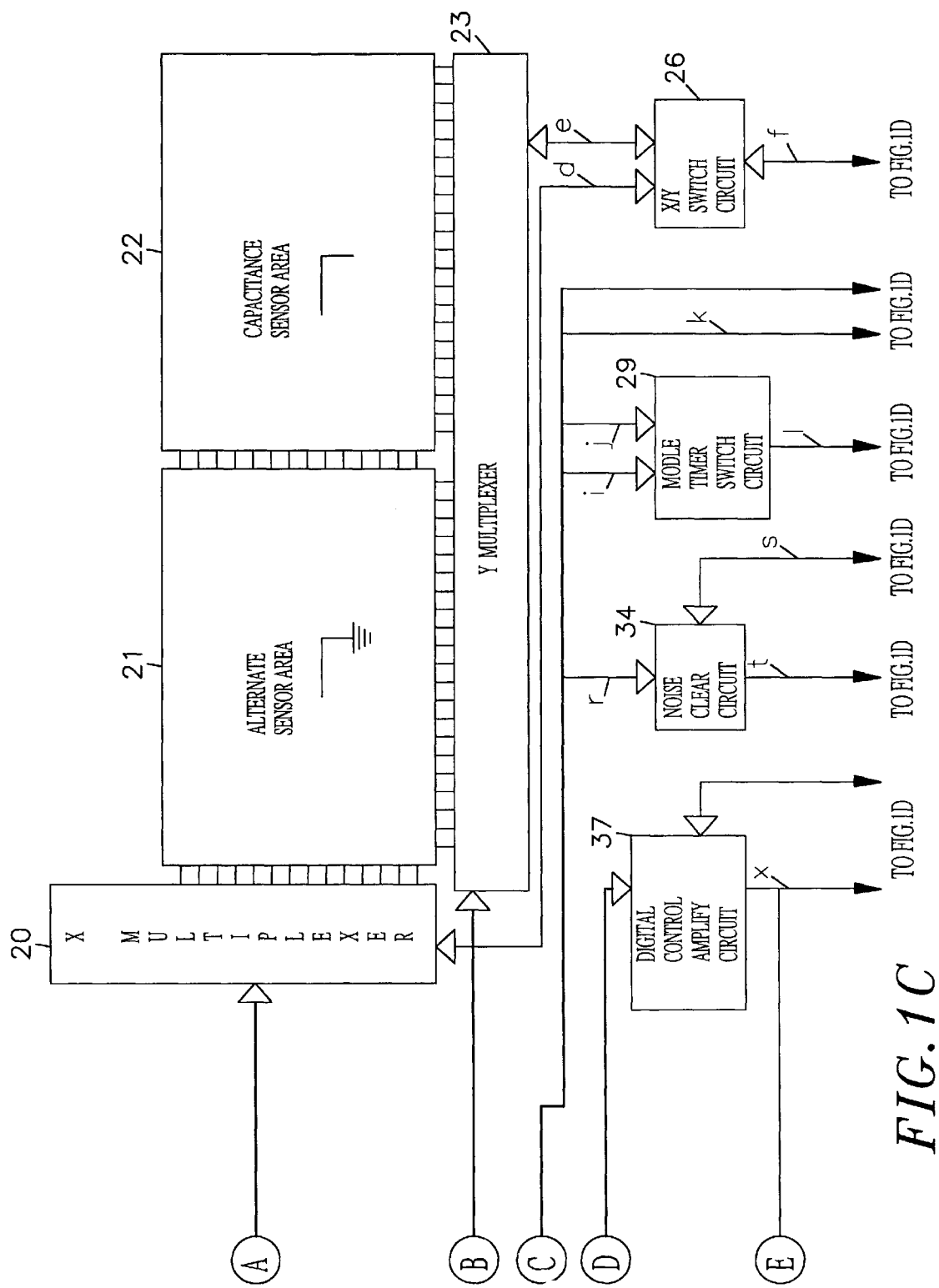

Referring to FIGS. 1A, 1B, 1C and 1D, when system power is on, crystal circuit 16 provides CPU 17 with the necessary oscillating signal S, causing CPU 17 to work. When working, CPU 17 sends signal O to enable model set buffer 12, then reads set status of model set buffer 12. Upon receipt of status signal N from model set buffer 12, CPU 17 sets the system form or switches the system to wireless induction pen (with or without battery) input mode, finger or static pen input mode, etc. At first, the system enters finger/static pen input mode.

When entered finger/static pen input mode, CPU 17 sends address line T to address buffer 18, and provides signal Y to enable address buffer 18, causing address buffer to send address signal W to scan sensor circuit 19. Scan sensor circuit 19 sends signal X to X multiplexer 20 and Y multiplexer 23, forming a complete scanning circuit. When a finger or static pen touches capacitance sensor area 22, a voltage is induced at the touched address and detected by scan sensor circuit 19. In order to detect the amount of static electricity carried by the finger or static pen, frequency signal must be applied to every conductor. Therefore, transmitting/receiving control signal i generated by timer generator circuit 24 is sent by model timer switch circuit 29 to transmitting/receiving circuit 30 for transmitting/receiving status signal control, enabling main frequency signal k to be sent from timer generator circuit 24 to transmitting/receiving circuit 30. When transmitting/receiving control signal i is of transmitting status, transmitting/receiving circuit 30 sends main frequency signal k to model switch circuit A 27 and then X/Y switch circuit 26, causing X/Y switch circuit 26 to provide signal X(d) and signal Y(e) to every conductor of capacitance sensor area 22. When the finger or static pen approaches, a signal amount change occurs at the conductors carrying main frequency signal k, i.e., the voltage of conductor signal at the area touched by the finger or static pen becomes increased, and the area not touched by the finger or static pen is maintained at the fixed voltage level. At this time, transmitting/receiving control signal I is switched to receiving status, and static voltage signal s induced by the finger of static pen is transmitted to noise clear circuit 34 to match with clear reference frequency r from digital control circuit 25 in clearing noises from induced static voltage signal. The noises been cleared include external noises and transmitting/receiving switching noises. Noise cleared signal t thus obtained is sent to signal amplify circuit 35 for amplification. Amplified signal u is then sent from signal amplify circuit 35 to compare circuit 36, enabling the most stable signal to be picked up. Stable signal V thus obtained from compare circuit 36 is then sent to digital control amplify circuit 37 via model switch circuit B 33. The time of amplification of digital control amplify circuit 37 can be adjusted by control signal C from CPU 17. If the intensity of scanned signal is low, the gain of digital control amplify circuit 37 is adjusted to the maximum status. On the contrary, if the intensity of scanned signal is high (saturated status), the gain of digital control amplify circuit 37 is adjusted to a lower level. Therefore, scanned signal is kept in the best position. The best static voltage signal x is then sent to integrator amplify circuit 38, and integrated by integrator amplify circuit 38 into signal y, which is in turn amplified by pos XY amplify circuit 39 into signal z. Signal z is then sent to band pass filter 40. Band pass filter 40 removes low/high noise frequency from signal z, and filtrates waveform of signal z, so as to provide pos XY A/D convert 41 with signal AA having a waveform similar to sine wave. Pos XY A/D convert 41 converts analog signal AA into TTL level pulse waveform of which the pulse width varies with movement of the finger or static pen on conductor loop area. The variation of the pulse width is indicative of the displacement of the finger or static pen. Pulse signal FF thus obtained is than sent to pos XY control circuit 45, causing pos XY control circuit 45 to send interruption signal QQ to CPU 17, and thus CPU 17 is informed to receive XY data coordinate produced by pos X/Y binary counter 49. Upon receipt of interruption signal QQ, CPU 17 sends signal JJ to enable pos XY data buffer 52, so as to obtain XY data SS from pos XY data buffer 52. XY data SS thus obtained is computed by CPU 17, and the XY coordinate value of the position of the finger or static pen at capacitance sensor area 22 is thus obtained.

Figure 4:
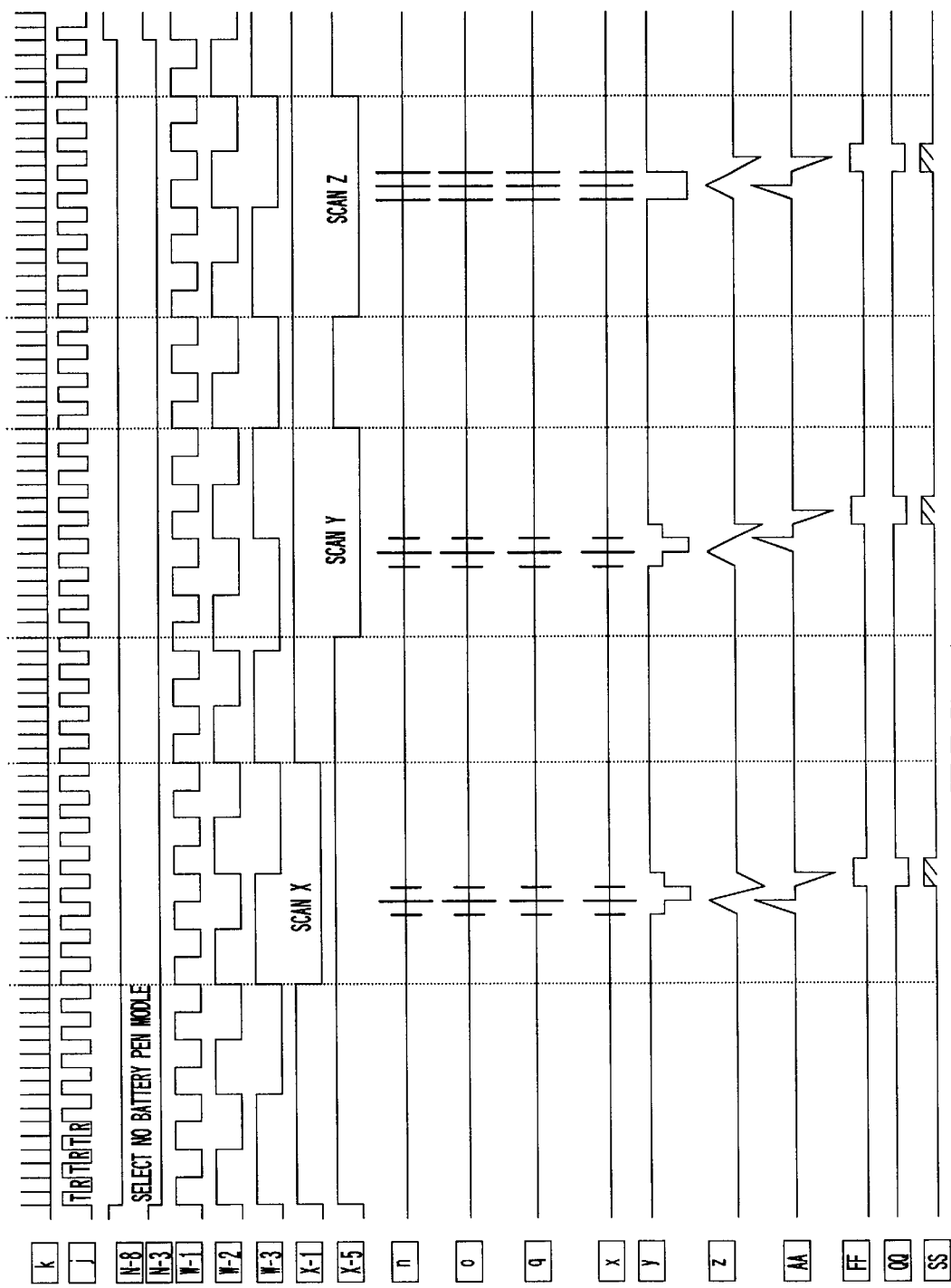
FIG. 4 is a wireless induction pen (non-battery type) signal waveform chart according to the present invention.

The second input medium of the present invention is a wireless induction pen (non-battery type). The operation flow of the second input medium is outlined hereinafter. CPU 17 reads the status of model set buffer 12. When entered wireless induction pen/cursor mouse (non-battery type) input mode, CPU 17 sends address line T to address buffer 18, and provides signal Y to enable address buffer 18, causing address buffer 18 to send address signal W to scan sensor circuit 19. Scan sensor circuit 19 sends signal X to X multiplexer 20 and Y multiplexer 23, forming a complete scanning circuit. When a wireless induction pen or cursor mouse touches alternate sensor area 21, the position of the wireless induction pen or cursor mouse is detected. Because the wireless induction pen or cursor mouse has no self-provided battery power supply, it cannot transmit energy signal, and main frequency signal is provided through the conductors of alternate sensor area 21 to the wireless induction pen or cursor mouse, enabling the wireless induction pen or cursor mouse to accumulate energy and then to transmit signal. Therefore, transmitting/receiving control signal j generated by timer generator circuit 24 is sent to model timer switch circuit 29, causing it to send signal e to transmitting/receiving circuit 30. When transmitting receiving signal is of transmitting state, main frequency signal k is sent from timer generator circuit 24 to model switch circuit A 27 through signal line m, causing model switch circuit A 27 to send signal f to X/Y switch circuit 26, and hence X/Y switch circuit 26 provides signal d and signal e to the conductor loop at alternate sensor area 21, causing an induction effect to be produced subject to the distribution of the conductor loop. Therefore, main frequency signal k is sent to induction coil of wireless induction pen or cursor mouse, causing matched capacitance to accumulate energy. At this time, the wireless induction pen or cursor mouse is capable of transmitting energy. When transmitting/receiving signal is changed to receiving status, the wireless induction pen or cursor mouse immediately discharges energy to the conductors, and discharged energy is then scanned by scan sensor circuit 19, and then sent through signal d and signal e to model switch circuit A 27 and transmitting/receiving circuit 30 via X/Y switch circuit 26, and scanned signal n is then sent to 2 class amplify circuit 31 for amplification. Amplified signal O is then sampled by sample & hold circuit 32. Digital control circuit 25 provides reference signal P to sample & hold circuit 32. Sample & hold circuit 32 picks up signal best waveform, and eliminates noises from signal during transmitting or receiving. Sampled signal g is sent to model switch circuit B 33, causing model switch circuit B 33 to provide signal w to digital control amplify circuit 37, therefore pressure analog/digital converter 44 obtains signal 00. By means of control signal c, CPU 17 adjusts amplification or contraction of scanned signal, and controls signal x obtained from digital control amplify circuit 37. Signal x is then sent by CPU 17 to integrator amplify circuit 38, and integrated by integrator amplify circuit 38 into signal y, which is in turn amplified by pos. XY amplify circuit 39 and then filtered into smooth analog waveform AA by band pass filter 40. Analog waveform AA is then sent to pos XY A/D convert 41, and converted by pos XY A/D convert 41 into TTL level pulse signal FF of which the pulse width varies with movement of the pen or mouse. The variation of the pulse width is indicative of the displacement of the pen or mouse. Pulse signal FF thus obtained is than sent to pos XY control circuit 45 and carried into system frequency, causing pos XY control circuit 45 to send interruption signal QQ to CPU 17. Upon receipt of interruption signal QQ, CPU 17 sends signal PP to XY data produced by pos X/Y binary counter 49, so that XY variation data SS of the position of the pen or mouse is obtained through XY data buffer 52. XY variation data SS is then computed through CPU 17, and the XY coordinate value of the position of the pen or mouse at capacitance sensor area 22 is thus obtained. The waveforms produced by the related circuits during this operation flow are shown in FIG. 4.

Figure 3:
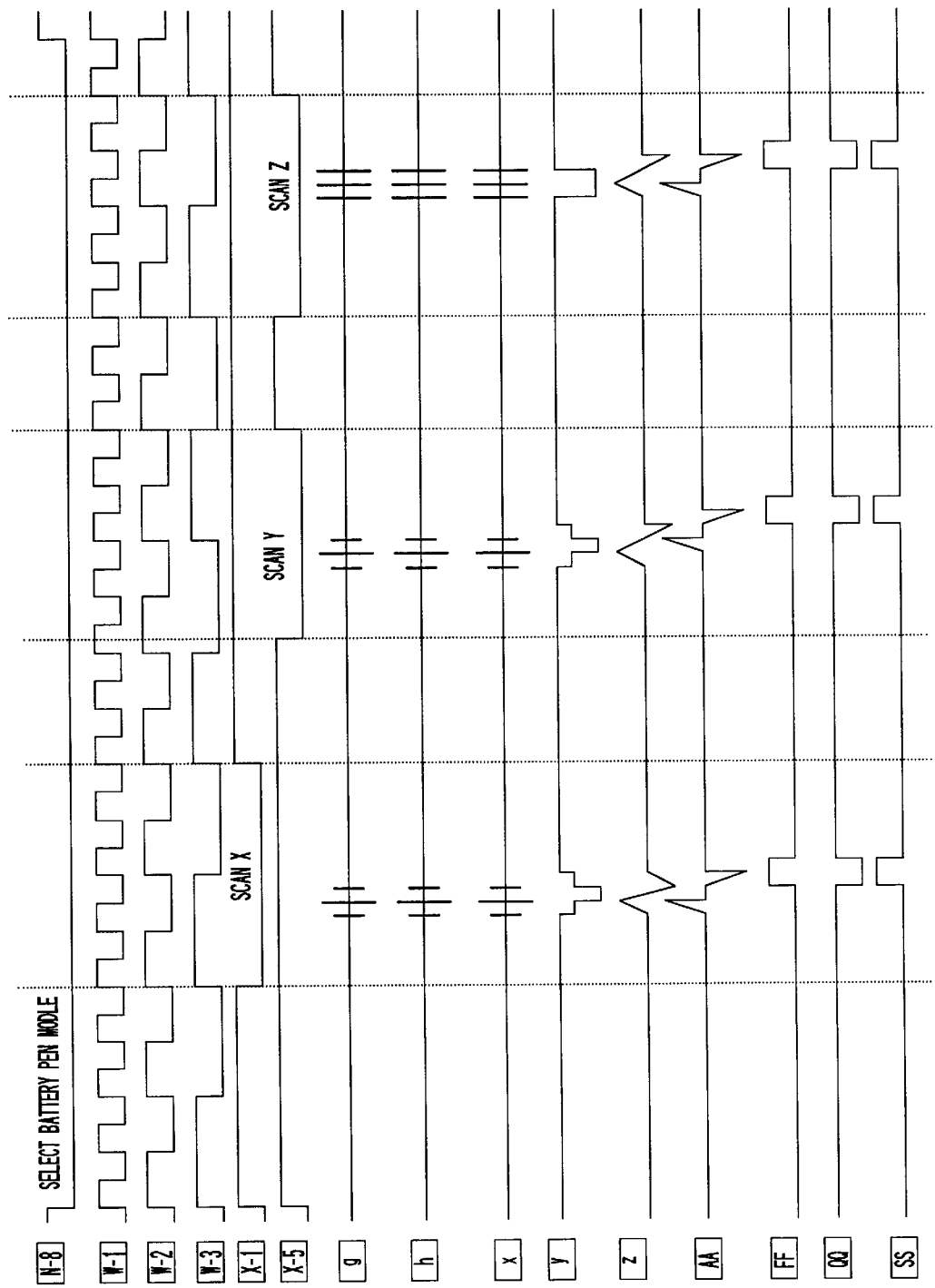
FIG. 3 is a wireless induction pen (battery-driven type) signal waveform chart according to the present invention.

The last input medium is a wireless induction pen (battery-driven) or wireless mouse (battery-driven). CPU 17 reads the status of model set buffer 12. When entered wireless induction pen/mouse (battery-driven) mode, the scanning circuit, which is formed of address buffer 18, scan sensor circuit 19, X multiplexer 20 and Y multiplexer 23 scans the position of the pen/mouse. Because the pen/mouse has self-provided battery power, the signal transmitting and receiving process is eliminated. Energy signal is directly sent from the pen/mouse through signal d and signal e to X/Y switch circuit 26, and then sent through signal line f to model switch circuit 27, causing model switch circuit 27 to provide induced signal g to 4 class amplify circuit 28 for amplification. Amplified signal h is then sent from 4 class amplify circuit 28 to model switch circuit B 33, causing it to provide signal W to digital control amplify circuit 37. In same manner, CPU 17 adjusts gain of signal W subject to signal 00. Adjusted signal X is then processed through integrator amplify circuit 38, pos. XY amplify circuit 39, band pass filter 40, and pos XY A/D convert 41, and pulse signal FF is thus obtained indicative of the position of the pen/mouse. The pulse width of pulse signal FF varies with the movement of the pen/mouse. Pulse signal FF is then sent by pos XY A/D convert 41 to pos XY control circuit 45, enabling system frequency to be carried therein. Upon receipt of pulse signal FF, pos XY control circuit 45 is driven to send interruption signal QQ to CPU 17, causing CPU 17 to obtain XY data SS from pos data buffer 52. XY data SS is then computed by CPU 17, and the XY coordinate value of the position of the pen/mouse (battery-driven) is thus obtained. The waveforms produced by the related circuits during this operation flow are shown in FIG. 3.

Figure 2:
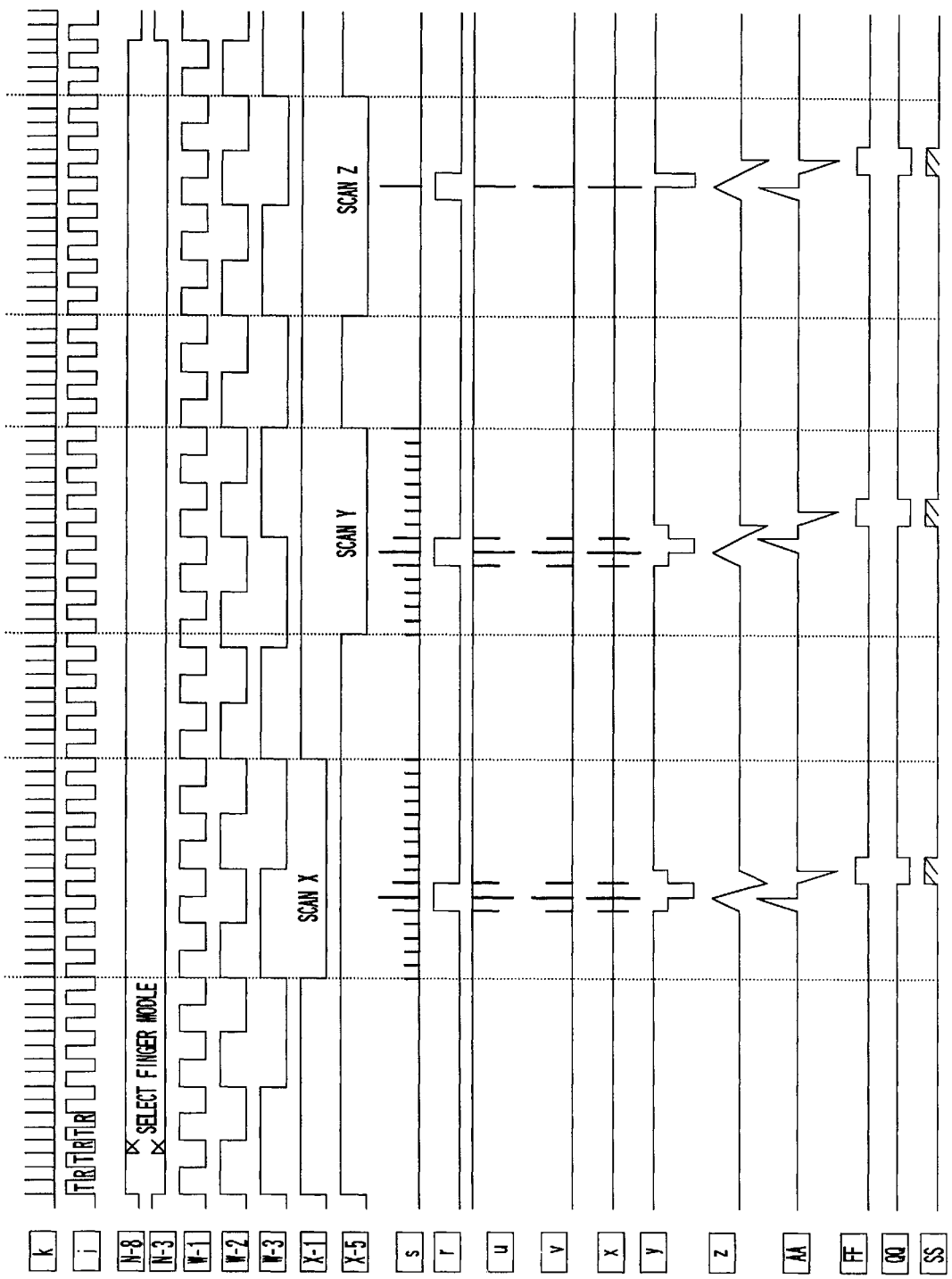
FIG. 2 is a finger/static pen signal waveform chart according to the present invention.

The system obtains the XY coordinate value of the position of the input medium placed on alternate sensor area 21 or capacitance sensor area 22 when scanning XY axes. In order to obtain the variation of Z-axis or On/Off status of the button, a special arrangement is required. When the position of Y-axis is obtained by means of scanning XY axes, the conductor Yn corresponding to the position of the pen/mouse is used as the reference conductor for detecting the variation of Z-axis, and CPU 17 uses conductor Yn for scanning Z-axis. Scanned signal is processed through circuits from 18 through 37 into waveform signal shown in FIGS. 2 and 3. The waveform of signal X (Z-axis) varies with the type of input medium. When a wireless electromagnetic pen (non-battery type) input medium is used, induced signal X is sent to phase detect circuit 42 for comparison with reference frequency signal BB from digital control circuit 25. When the tip or button is not pressed, the energy frequency emitted from the pen is equal to reference frequency signal BB, and the potential of output signal is "LOW". When the tip or button is pressed, the energy frequency emitted from the pen is different from reference frequency signal BB, and the potential of output signal is "High". Subject to the potential of output signal, the On/Off status of the tip or button is known. After comparison, phase detect circuit 42 provides output signal CC to auto level detect circuit 43 for level adjustment. The distance (height) between the pen/mouse and alternate sensor area 21 affects the energy receiving/transmitting condition (strength) of the pen/mouse. Auto level detect circuit 43 automatically adjusts signal level subject to the level of the pen/mouse on alternate sensor area 21. Level adjusted signal DD is then sent from auto level detect circuit 43 to compare circuit 47, enabling compare circuit 47 to pick up signal HH from signal DD. Signal HH is further sent to Z S/H (Z-axis sample hold) circuit 48. Z S/H circuit 48 picks up Z-axis signal II from signal HH, and sends it to Z counter circuit 51, causing Z-counter circuit 51 to send signal MM to model selector circuit C 50. Upon receipt of signal MM, model selector circuit C 50 provides tip or button status variation signal value NN to CPU 17 for On/Off status judgment. Because different tip or button induces different frequency, different signal value NN will be produced subject to the type of tip or button. Scanned signal X obtained from the procedure of scanning the pen/mouse (battery-driven type) is sent to amplify circuit 46 for amplification. Amplified waveform GG is then sent to compare circuit 47, causing compare circuit 47 to output signal HH to Z S/H circuit 48. Upon receipt of signal HH, Z S/H circuit 48 provides Z-axis signal II to Z counter circuit 51, causing Z-counter circuit 51 to send signal LL to model selector circuit C 50. Upon receipt of signal LL, model selector circuit C 50 provides tip or button status variation signal value NN to CPU 17 for On/Off status judgment. Z-axis pressure variation is controlled by another line. Further, output signal EE from band pass filter 40 is transmitted to pressure A/D convert 44, causing it to provide pressure variation signal 00 to CPU 17.

Figure 5:
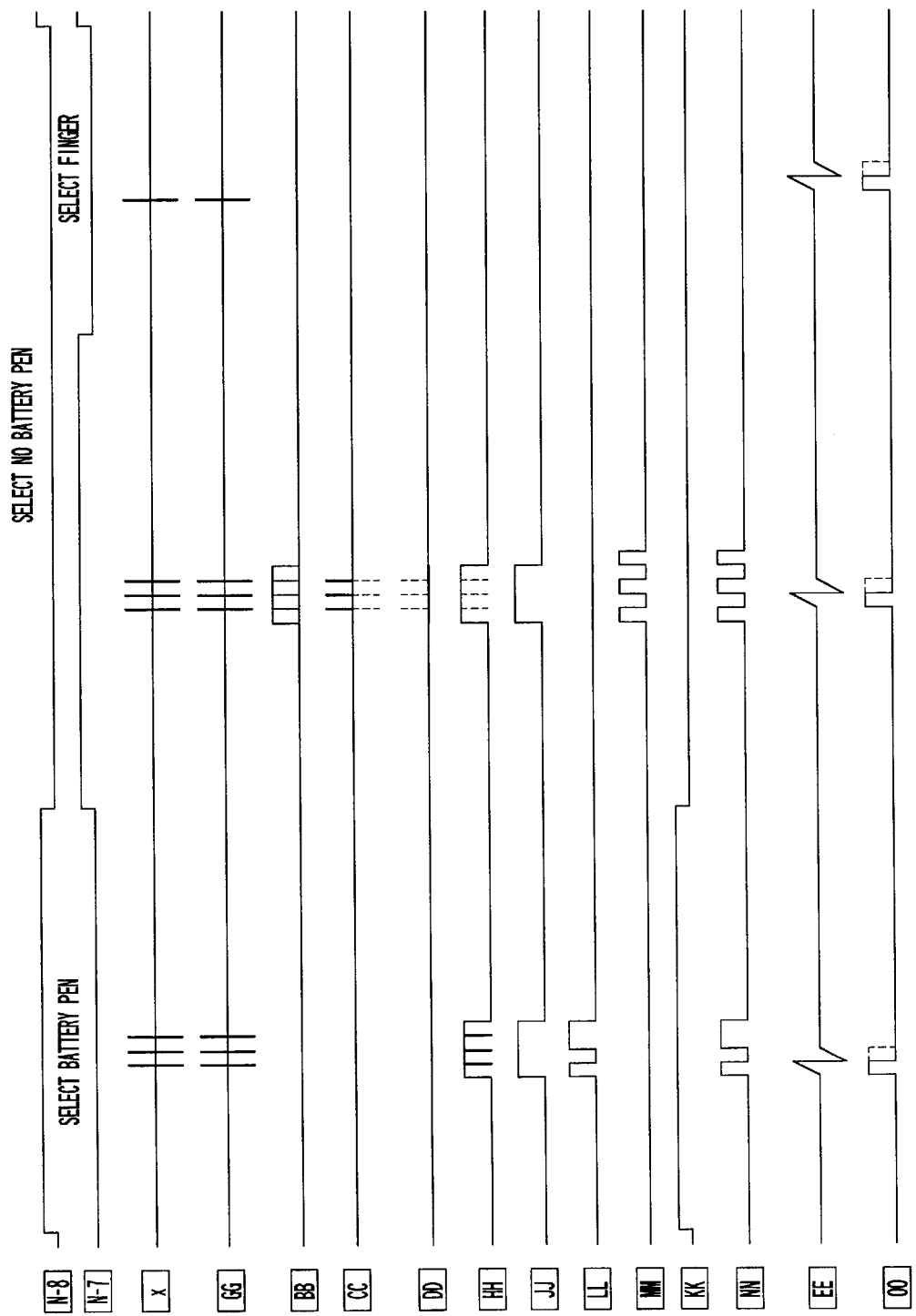
FIG. 5 is a button function and pen pressure (Z-axis) signal waveform chart according to the present invention.

CPU 17 obtains tip pressure start message subject to On/Off status of the tip, and data before and after pressure from signal 00 for calculating the variation of Z-axis pressure. With respective to finger or static pen detection, the system can only detect the presence of a finger or static pen. The button is at "On" status if the time in which the finger or static pen is induced, and then disappeared, and then induced again is within 0.5 second. On the contrary, the button is at "Off" status if the time in which the finger or static pen is induced, and then disappeared, and then induced again surpasses 0.5 second. The pressure variation is measured from pressure variation signal 00 from pressure A/D convert 44. The produced by the related circuits during this operation flow are shown in FIG. 5.

Figure 6A:
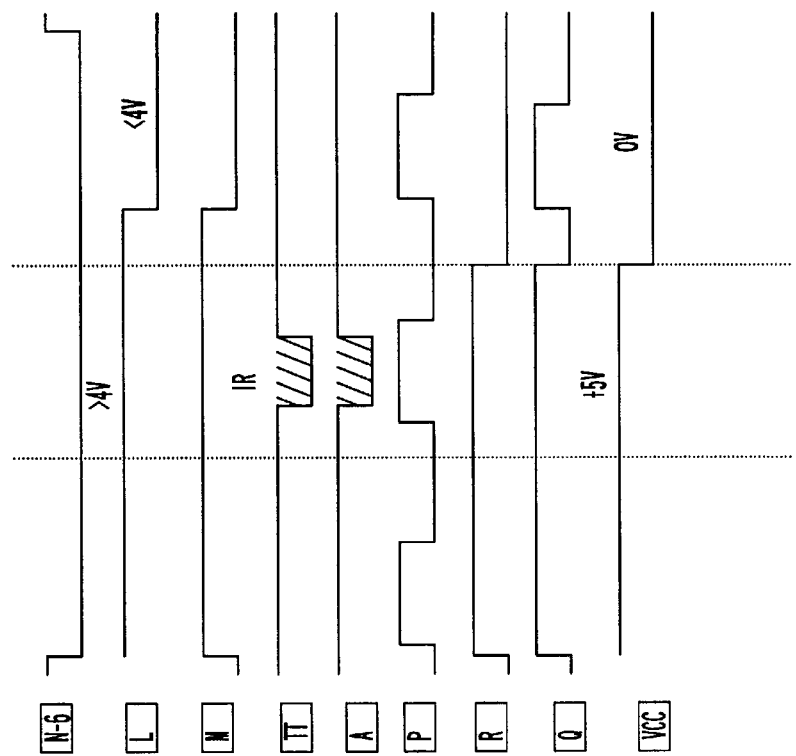
FIGS. 6 and 6A together form a data transmission interface switching and power down mode waveform chart according to the present invention.
Figure 6:
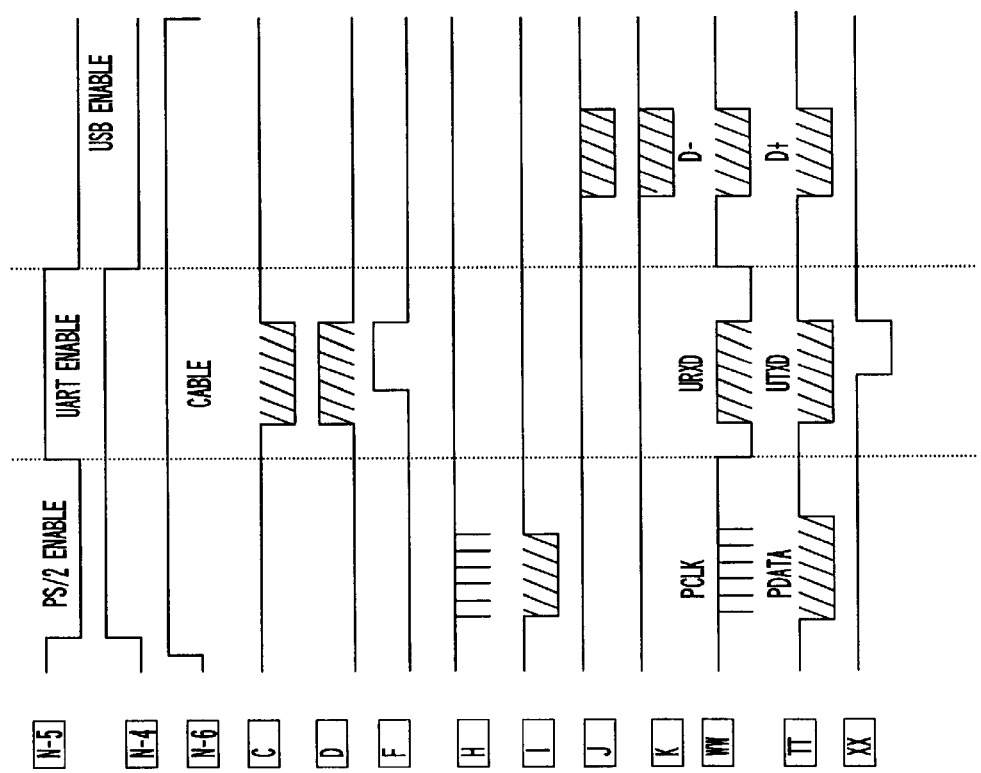

When the message of a particularly input medium is obtained by the system, XYZ coordinate value thus obtained is controlled through model set buffer 12 for different interface transmission. CPU 17 reads current interface transmission mode from model set buffer 12. When current interface transmission is set for PS/2, interface select circuit 03 is switched to PS/2 interface transmission, enabling CPU 17 to send PS/2 data format to the host's PS/2 port 08 by means of signal TT and WW. If current interface transmission is set for UART, CPU 17 sends the data to interface select circuit 03 through TT, WW and XX, causing UART TXD circuit 05, UART RXD circuit 06, UART RTS circuit 07 to be connected to UART port 04. If current interface transmission is set for USB (universal serial bus), CPU 17 communicates with USB port 09 via signal TT and WW and signal J and K. The above statement describes the connection to the host. The related waveforms are shown in FIG. 6.

When interface select circuit 03 is set for infrared transmission, the power source 10 is battery +6V. Because the battery has a limited service life, the system uses a power save mode to extend the service life of the battery. When the system enters an input medium input mode, the X-Y-Z coordinate value of the position of the input medium is sent with signal TT to interface select circuit 03, causing interface select circuit 03 to send signal A to TV IR (infrared) transmitting circuit 02 for transmission to the TV IR receiving unit 01 of the host network TV. The TV IR receiving unit 01 converts infrared data format to the interface format of the host, enabling the X-Y-Z coordinate value from the transmitter side to be sent to the inside of the host. If the input medium is left from the sensor area, CPU 17 immediately enters power down mode. Before entering power down mode, CPU 17 sends signal R to power control circuit 15 and reset switch circuit 14. Upon receipt of signal R, power control circuit 15 turns off system component power (CPU and wake up timer circuit 13 excluded). When reset switch circuit 14 receives signal R after system power consumption has been reduced to the lower limit, reset switch circuit 14 is switched from Vcc to wake up timer circuit 13. Wake up timer circuit 13 wakes up CPU 17 once per 0.25 second (when CPU 17 is in power down mode). If the input medium is placed on the sensor area gain, CPU 17 immediately enters normal operation mode after having been waked up, and outputs signal R to turn on all power source, enabling the system to work normally. When battery power drops below +4V, +4V voltage signal is sent with signal L to voltage detect circuit 11. When the voltage at the input end of voltage detect circuit 11 drops below +4V, voltage detect circuit 11 turns signal M from "High" to "Low", and informs CPU 17 of power low status, causing CPU 17 to trigger power low indicator LED (light emitting diode). The waveforms of the related circuits are shown in FIG. 6A.

Figure 7A:
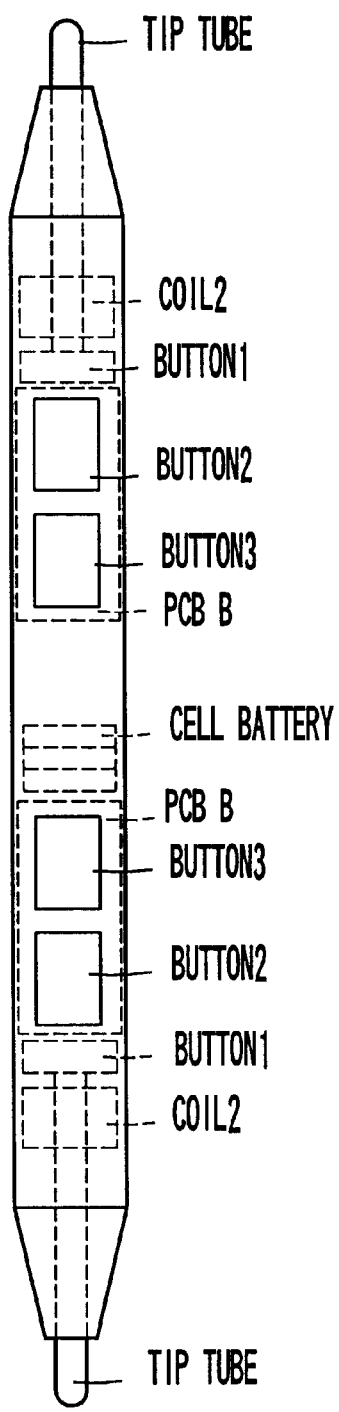
FIGS. 7A, 7B, and 7C illustrate structures of wireless induction pens and cursor mice according to the present invention.
Figure 7B:
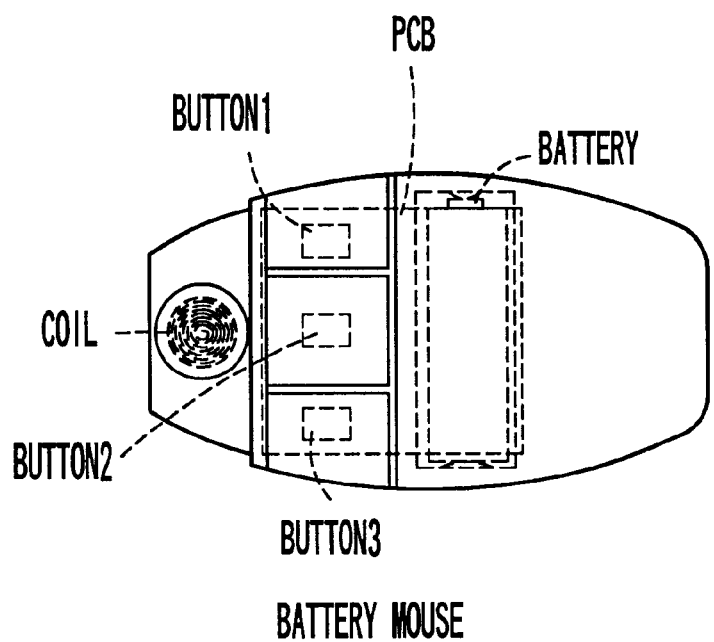
Figure 7C:
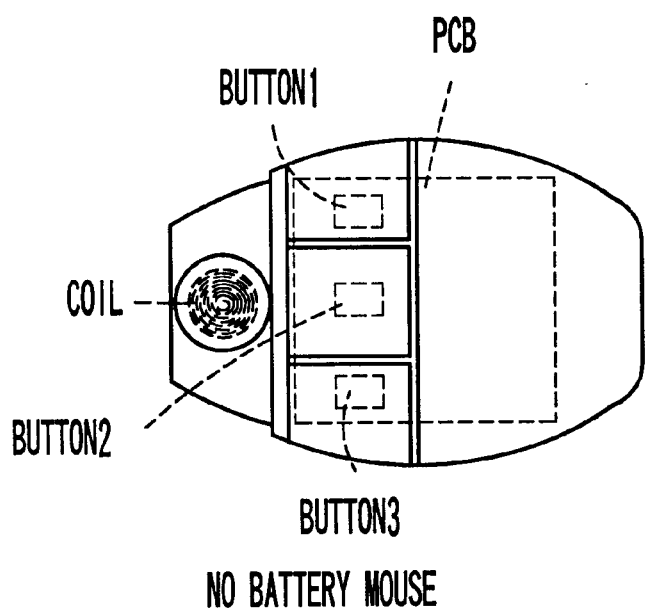

FIGS. 7A, 7B and 7C show structures of wireless induction pens and mice according to the present invention. The wireless induction pen shown in FIG. 7A has both ends workable. The structure of the body of this pen can be of battery-driven or non-battery type. Using a software program to give an instruction, the system is driven to switch battery-driven input medium input mode to non-battery input medium input mode. When the battery power of the battery-driven input medium is low, the user can switch battery-driven input medium input mode to non-battery input medium input mode, enabling the battery-driven input medium to work with the system continuously. FIGS. 7B and 7C show a battery-driven mouse and a non-battery mouse. The functions of these mice are similar to the wireless induction pen.

Figure 8:
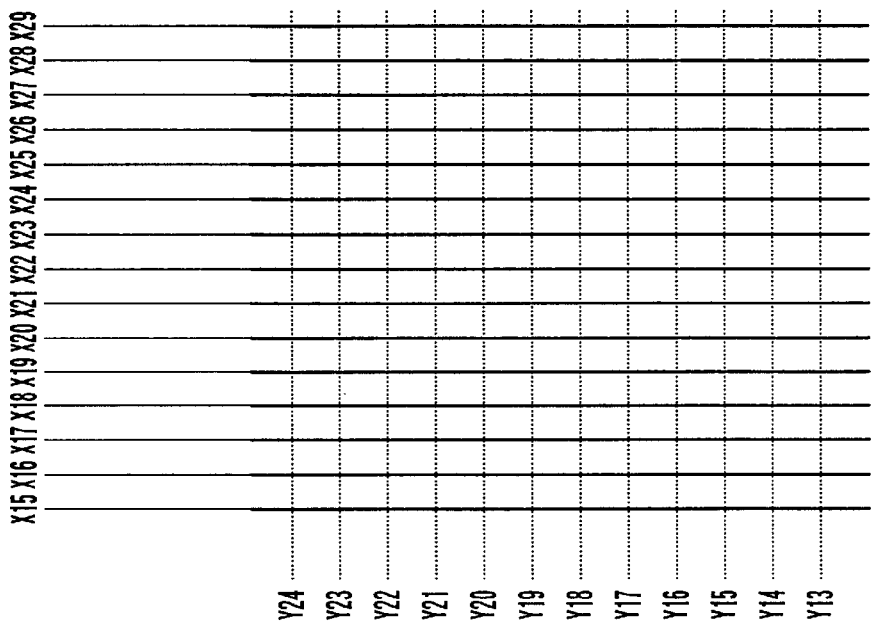
FIG. 8 illustrates the arrangement of alternate sensor area type conductors and capacitive sensor area type conductors according to the present invention.
Figure 8:
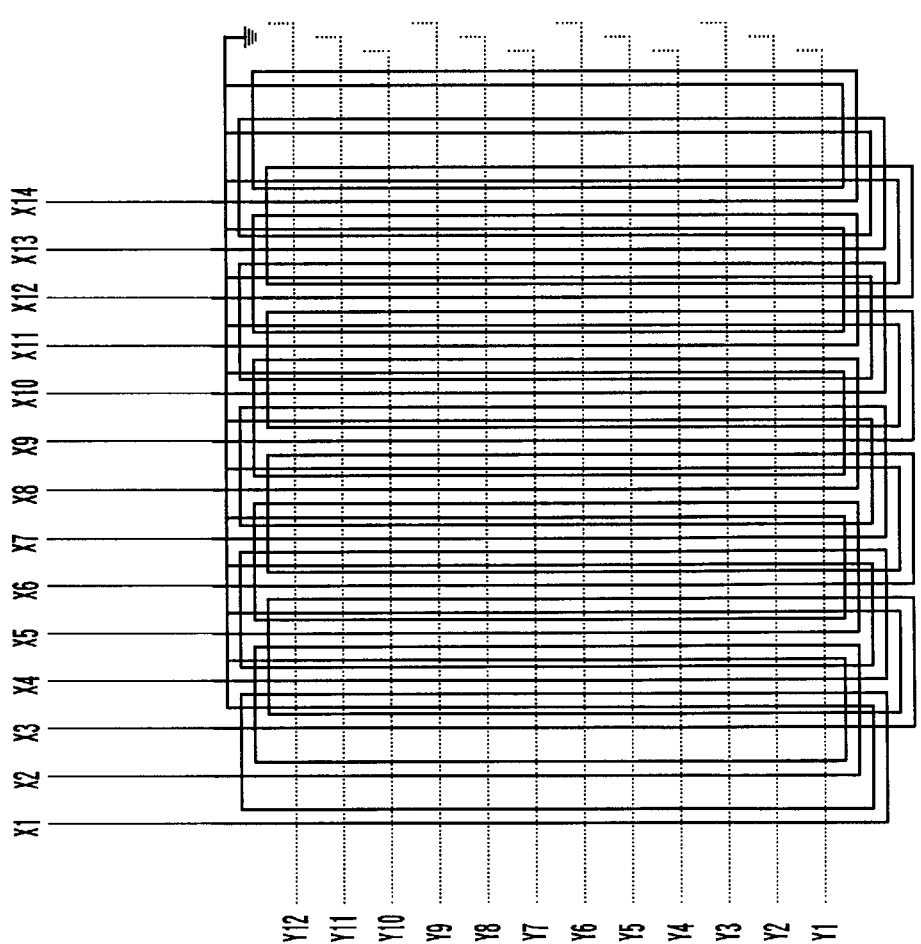
Figure 9:
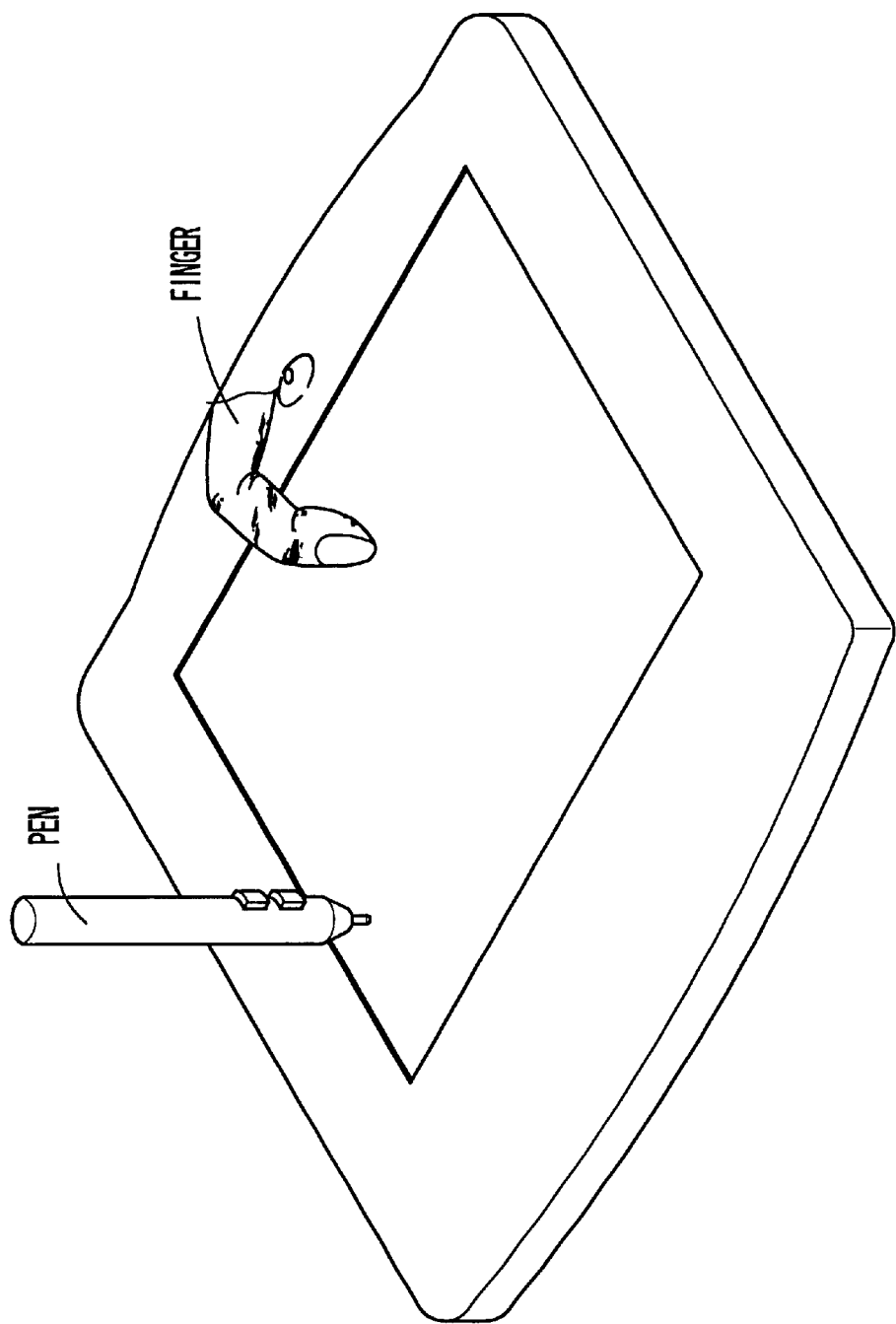
FIG. 9 illustrates concomitant application of a wireless induction pen and a finger according to the present invention.
Figure 10:
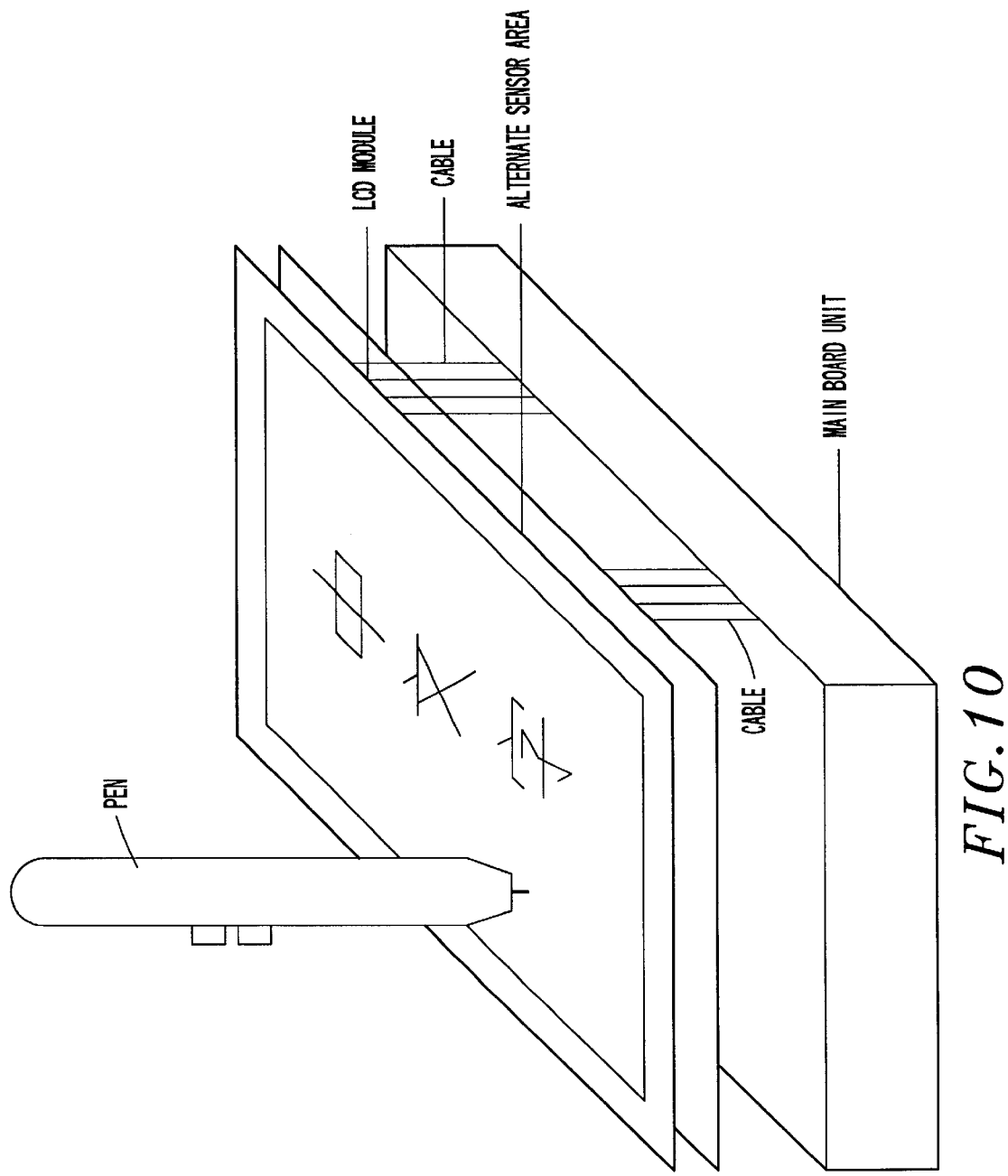
FIG. 10 illustrates the application of a wireless induction pen to the LCD module according to the present invention.

FIG. 8 illustrates alternate sensor area type double-loop conductor arrangement and capacitance sensor area type double-loop conductor arrangement. The circuit of alternate sensor area 21 detects wireless induction pen and mouse. Capacitive sensor area 22 detects finger and static pen. Because alternate sensor area 21 and capacitive sensor area 22 have a respective wiring for scan sensor circuit 19, they are separated from each other, and the user can simultaneously use a finger and a wireless induction pen to draw lines on alternate sensor area 21 and capacitive sensor area 22. FIGS. 9 and 10 show a finger and a wireless induction pen simultaneously used. According to the preferred embodiment of the present invention, capacitive sensor area 22 is disposed at the top, and alternate sensor area 21 is disposed at the bottom. Capacitive sensor area 22 is connected to circuit board by cable A. Alternate sensor area 21 is connected to circuit board by cable B. Circuit board detects the address coordinate of wireless induction pen, and then detects the address coordinate of finger, and then calculates XYZ coordinates value of each input medium.

FIG. 10 illustrates the application of a wireless induction pen to a LCD module. A regular commercially available notebook computer or PDA has a transparent face panel ITO covered on its LCD module. However, this transparent face panel wears quickly with use, causing great inconvenient to the user. For example, the impedance of the transparent face panel varies with time of use, ambient humility. When the transparent face panel starts to wear, the sensibility of the instrument is affected. In order to eliminate this problem, the present invention installs alternate sensor area 22 in the instrument below the LCD module. A wireless induction pen can send signal through the LCD module to the printed circuit board of alternate sensor area 22, enabling the related data to be sent to main board unit, causing the host computer to show written characters on the LCD module.

It is to be understood that the drawings are designed for purposes of illustration only, and are not intended for use as a definition of the limits and scope of the invention disclosed.

What the invention claimed is:

1. A multifunction input device comprising a double-loop conductor array, at least one input medium, and a data processing circuit, wherein said double-loop conductor array comprising a capacitive sensor area loop arranged at an upper side and an alternate sensor area loop arranged at a lower side below said capacitive sensor area loop for detecting the position of said at least one input medium and calculating XYZ coordinate value of each input medium; said at least one input medium causes conductors of said double-loop conductor array to produce induction current and static current when closing/touching a surface of said double-loop conductor array; said data processing circuit comprising frequency transmitting and receiving circuit means and scanning circuit means to scan position of said at least one input medium, signal amplify circuit means to amplify signal obtained from said frequency transmitting and receiving circuit means and scanning circuit means, noise eliminating circuit means to eliminate noise from amplified signal obtained from said signal amplify circuit means, sample hold circuit means to hold signal obtained from said noise eliminating circuit means, analog/digital converter means to convert signal obtained from said sample hold circuit means into digital signal, a CPU (central processing unit) to calculate data of digital signal obtained from said analog/digital converter means into XYZ coordinate value corresponding said at least one input medium, computer interface means, a model set buffer controlled to set said computer interface means for the transmission of said XYZ coordinate value to the receiver unit of a host computer through an interface.

2. The multifunction input device of claim 1 wherein said at least one input medium includes a wireless induction pen, a power-driven cursor mouse, a powerless cursor mouse, a static pen, and a finger.

3. The multifunction input device of claim 1 wherein the conductors of said alternate sensor area loop provide a main frequency signal to said at least one input medium, enabling the scanning circuit means of said data processing circuit to scan position of said at least one input medium.

4. The multifunction input device of claim 1 wherein the scanning circuit means of said data processing circuit detects the length of time of the pressure from said at least one input medium, and sends a corresponding signal to a Z-axis sample hold circuit of said sample hold circuit means, enabling said CPU to obtain Z-axis variation data.

5. The multifunction input device of claim 1 wherein said computer interface means includes UART interface means, PS/2 interface means, USB (universal serial bus) interface means, and infrared interface means, and is selectively controlled by an interface select circuit of said data processing circuit.

6. The multifunction input device of claim 1 further comprising a power down mode control circuit means, which drives said CPU to turn on a warning LED (light emitting diode when power supply drops from +6V to below +4V during an infrared transmission mode set through said computer interface means.

7. The multifunction input device of claim 1 wherein network TV interface is connected to computer interface means for data output.

8. The multifunction input device of claim 2 further comprising a software program for providing an instruction to switch said wireless induction pen, said power-driven cursor mouse, and said powerless cursor mouse from a battery operation mode to non-battery operation mode.

* * * * *